UNITED STATES PATENT OFFICE.

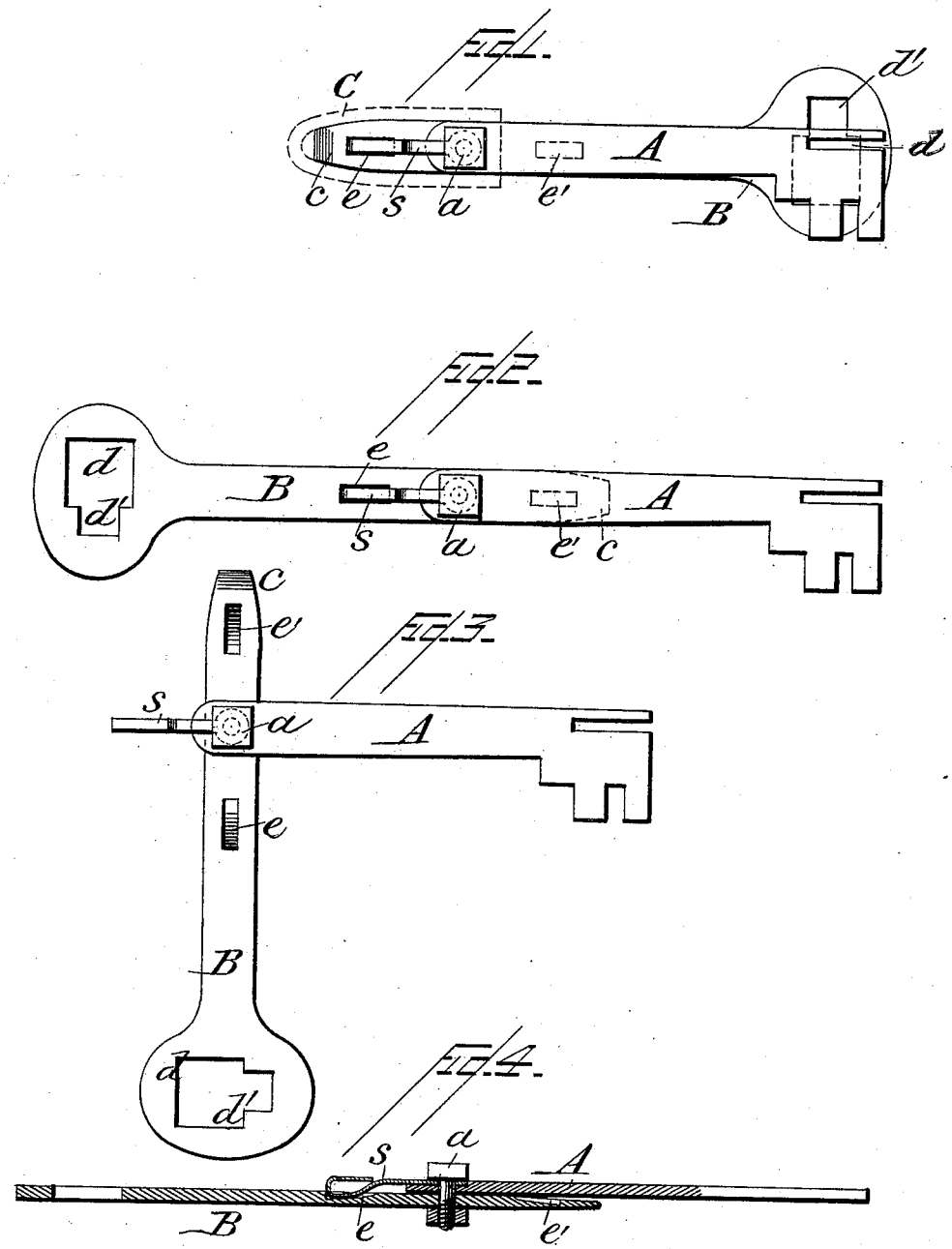

WILLIAM STUART ROSS, OF MADISONVILLE, KENTUCKY.

COMBINATION IMPLEMENT.

SPECIFICATION forming part of Letters Patent No. 384,592, dated June 12, 1888.

Application filed March 15, 1888. Serial No. 267,240. (No model.)

*To all whom it may concern:*

Be it known that I, WILLIAM STUART ROSS, a citizen of the United States, residing at Madisonville, in the county of Hopkins and State of Kentucky, have invented certain new and useful Improvements in Combination Implements; and I do declare the following to be a clear, full, and exact description of the invention, such as will enable others skilled in the art to which it appertains to make and use the same, reference being had to the accompanying drawings, and to the letters and figures of reference marked thereon, which form a part of this specification.

This invention relates to improvements in that class of implements usually known as "combination tools," the object being to adapt a tool or implement by changes in its construction to a variety of uses. In the present instance an ordinary key for a lock is provided with devices which render it capable of use as a screw-driver or wrench, thus enabling a person by means of these devices to use an article, which almost every one carries in his pocket, to readily tighten the nuts upon the bolts of a vehicle or insert screws, if necessary, in case of accident to the same, or for ready use in any of the frequently-occurring cases in which these implements are wanted.

In constructing this implement I prefer to flatten the shank of the key, removing the loop which forms the ordinary handle, and attaching to the shank by means of a pivot a piece of metal, one end of which forms a screw-driver and the other the key-handle, which handle, instead of the oval opening in common use, is provided with a polygonal opening, which allows of its use as a wrench. A spring-catch is secured to the key-shank, its end entering recesses formed in the handle-piece to hold it either closed upon the shank or open as in position for use as either a key or wrench.

If desired, a cap may be made to slip over the end of the shank and handle when the latter is turned, to lie parallel with the shank, thus allowing the end of the handle which forms a screw-driver to be covered and the pocket protected from the wear of its sharp corners.

In the accompanying drawings, Figure 1 shows the implement closed and the end covered with a cap. Fig. 2 is a side elevation of it open, the parts being in the position they occupy when it is to be used as a key or wrench. Fig. 3 shows the implement arranged to be used as a screw-driver. Fig. 4 is a longitudinal section through both shank and handle, showing the arrangement of the spring.

In the several figures, A represents the shank of the key, and B the handle. This handle is pivoted to the shank by a screw or rivet, $a$, passing through both parts, so as to firmly connect but still allow them to turn freely upon each other. One extremity of this handle, as shown at $c$, forms a screw-driver, while its opposite end is enlarged to form the lobe or part which is grasped in turning the key, and is pierced by the rectangular opening $d$, forming a wrench. An additional opening or recess, $d'$, adjoining the large opening, makes a wrench adapted to fit bolts or nuts of less size than those fitted by the large opening. It will be apparent that the size and form of these openings may be varied, as when it is desired to make the wrench fit a hexagonal or octagonal nut.

The connecting end of part A is secured by the rivet $a$, and firmly held in place by a groove in the said end is the spring $s$, the outer or free end of which is bent over to form a loop, which loop enters the recesses $e$ and $e'$, formed for its reception in one side of the handle, the end of the spring resting in the recess $e$ when the two parts of the implement are extended in line with each other or arranged, as shown in Fig. 2, to be used as a key or wrench; but when the parts are closed upon each other the free end of this spring rests in the recess $e'$ and holds the shank and handle, as shown in Fig. 1, or in the position they occupy when in the pocket or in use as a screw-driver. To prevent the corners of this screw-driver from cutting holes in the pocket, I prefer to cover it, as well as the pivot and spring, with a thimble-shaped cap, C, of metal, hard rubber, or other suitable material, which may be slipped over the parts and will be retained in position by its own elasticity, thus forming a perfect protection from injury by the sharp corners of the screw-driver.

Sectional keys with a spring-catch have been made, as shown in a patent to Brady, March 31, 1874, No. 149,191. In these cases, however, they have only the functions of a key, which construction I do not broadly claim; but they are not adapted to be used for other purposes—viz., as a wrench and screw-driver, as shown and described in this specification.

Having thus described my invention, I claim as new, and desire to secure by Letters Patent of the United States, the following:

1. As an improvement in combination implements, the key-shank provided with a pivoted handle, one end of said handle forming a wrench and the opposite end a screw-driver, substantially as and for the purpose specified.

2. In a combination implement, the key-shank, handle provided with screw-driver and wrench pivoted to said shank, and the spring secured to said shank with its free end entering recesses in the handle, all arranged and operating as set forth.

In testimony whereof I affix my signature in the presence of two witnesses.

WILLIAM STUART ROSS.

Witnesses:
J. A. SOUTHALL,
JNO. T. ADAMS.